United States Patent
Kim et al.

(10) Patent No.: US 9,116,019 B2
(45) Date of Patent: Aug. 25, 2015

(54) TECHNIQUE FOR COMPENSATING FOR ABNORMAL OUTPUT OF RESOLVER FOR ENVIRONMENTALLY FRIENDLY VEHICLE

(75) Inventors: Bum Sik Kim, Gyeonggi-do (KR); Tae Hwan Chung, Gyeonggi-do (KR); Kang Ho Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 166 days.

(21) Appl. No.: 13/467,363

(22) Filed: May 9, 2012

(65) Prior Publication Data
US 2013/0151042 A1    Jun. 13, 2013

(30) Foreign Application Priority Data
Dec. 8, 2011 (KR) .................. 10-2011-0130669

(51) Int. Cl.
*B60L 15/00* (2006.01)
*G01D 5/244* (2006.01)
*G01D 5/249* (2006.01)
*H02P 6/16* (2006.01)

(52) U.S. Cl.
CPC ............ *G01D 5/2449* (2013.01); *G01D 5/2495* (2013.01); *H02P 6/16* (2013.01)

(58) Field of Classification Search
CPC ....... G01D 5/2449; G01D 5/2495; H02P 6/16
See application file for complete search history.

(56) References Cited

U.S. PATENT DOCUMENTS

| | | | |
|---|---|---|---|
| 5,691,611 A | 11/1997 | Kojima et al. | |
| 5,874,821 A * | 2/1999 | Monleone | 318/600 |
| 6,326,908 B1 * | 12/2001 | Hoffman et al. | 341/111 |
| 6,525,502 B1 * | 2/2003 | Piedl et al. | 318/605 |
| 2005/0216218 A1 * | 9/2005 | Kawamura | 702/106 |
| 2009/0066324 A1 * | 3/2009 | Nagamoto | 324/207.25 |
| 2011/0029178 A1 * | 2/2011 | Kawakami et al. | 701/22 |
| 2011/0031913 A1 * | 2/2011 | Mori et al. | 318/400.04 |
| 2011/0089875 A1 | 4/2011 | Patel et al. | |

FOREIGN PATENT DOCUMENTS

| | | |
|---|---|---|
| JP | 2009173098 A | 8/2009 |
| JP | 2010273500 A | 12/2010 |
| KR | 10-2009-0062343 | 6/2009 |
| KR | 10-1039676 | 5/2011 |

* cited by examiner

*Primary Examiner* — John Q Nguyen
*Assistant Examiner* — Alan D Hutchinson
(74) *Attorney, Agent, or Firm* — Mintz Levin Cohn Ferris Glovsky and Popeo, P.C.; Peter F. Corless

(57) ABSTRACT

Disclosed is a technique for compensating for an abnormal output of a resolver. More specifically, a central processing unit (CPU) sets a current motor position angle before compensation $\theta_{n,ORG}$ as a current motor position angle $\theta_n$ and obtains a motor position change $\Delta\theta_n$[rad] between a current sampling [n] and a previous sampling [n−1] and a motor position change $\Delta\theta_{n-1}$[rad] between the previous sampling [n−1] and a more previous sampling [n−2]. Subsequently, a variable A is calculated based on the above angles. The CPU determines whether to perform the compensation by comparing the calculated variable A and a calibration variable K and calculates a current motor position angle for compensation $\theta_n$[rad]. Finally, the CPU compensates for the absence of motor rotor position information with the calculated current motor position angle for compensation $\theta_n$[rad].

12 Claims, 5 Drawing Sheets

(a) Before applying compensation method (b) After applying compensation method

TECHNIQUE FOR COMPENSATING FOR ABNORMAL OUTPUT OF RESOLVER FOR ENVIRONMENTALLY FRIENDLY VEHICLE

CROSS-REFERENCE TO RELATED APPLICATION

This application claims under 35 U.S.C. §119(a) the benefit of Korean Patent Application No. 10-2011-0130669 filed Dec. 8, 2011, the entire contents of which are incorporated herein by reference.

BACKGROUND (a) Technical Field

The present invention relates to a technique for compensating for an abnormal output of a resolver for an environmentally friendly vehicle. More particularly, it relates to a method for compensating for an abnormal output of a resolver for an environmentally friendly vehicle, which prevents the occurrence of errors in the rotor position angle and speed estimation of a motor due to an abnormal AD conversion error in a resolver-to-digital converter (RDC).

(b) Background Art

Typically, a drive motor for converting electrical energy into mechanical energy and an inverter for controlling the operation of the drive motor are mounted in environmentally friendly vehicles such as hybrid vehicles, electric vehicles, hydrogen fuel cell vehicles, etc.

As shown in FIG. 3, the inverter 100 includes: a power module 101 (e.g., an insulated gate bipolar transistor, IGBT) which transmits electrical energy between a battery 110 and an interior permanent magnet synchronous motor (IPMSM) 120. A direct current (DC) link capacitor 102 absorbs the ripple component of DC voltage caused by the operation of the inverter 100 to prevent the ripple component from being transmitted to the battery 110. A DC link voltage sensor 103 measures the DC voltage of the inverter 100, i.e., the voltage at both ends of the DC link capacitor 102 to be used to control the inverter 100. A DC link voltage sensing circuit 104 processes the output of the DC link voltage sensor 103 to have a magnitude capable of being input to an analog/digital (AD) converter and, at the same time, prevents the occurrence of a voltage measurement error due to noise, etc.

A current sensor 105 measures the alternating current of the inverter 100 to be used to control the inverter 100 and a current sensing circuit 106 processes the output of a current sensor in a current sensor module to have a magnitude capable of being input to the AD converter and, at the same time, prevents the occurrence of a current measurement error due to noise, etc. A central processing unit (CPU) 107 is equipped with a software program stored on a computer readable medium that is executed by a processor to control the inverter 100 and the overall operation of the inverter 100 by using measured physical parameters received from the sensors 103 and 105. A control/gate board 108 is equipped with the above-described circuits and components used to control the inverter 100.

More specifically, however, a resolver 122 in automotive applications detects the speed of the motor and the angle of a rotor that is used in the synchronous motor 120. Thus, the sensing and failure detection of the resolver 122 is one of the most important factors in controlling the motor effectively.

At present, as shown in FIG. 4, the occurrence of a failure in the resolver 122 is conventionally detected as follows. In the event of a failure in input signals (i.e., excitation signals, EXT+, EXT−) or output signals (i.e., basic signals for measuring the speed, S1-S3, S2-S4) of the resolver 122, a FAULT signal is generated by a resolver-to-digital converter (RDC) 124, and the digital FAULT signal transmitted to the CPU 107 is input to a CPU, e.g., a motor controller, thereby detecting the occurrence of a failure in the resolver 122.

However, when the voltage margin is reduced by the maximum torque operation of the motor at high temperature and at low speed and during overmodulation, the occurrence of an abnormal AD conversion error in the RDC causes errors in the rotor position angle and speed estimation of the motor, which are used to control the motor. Therefore, due to the absence of resolver position information, the temperature of the motor is increased, the controllability of the motor current is reduced, and an overcurrent occurs in the motor. As a result, the hybrid function of a hybrid vehicle may be disabled. Even worse, in some instances the operation of the electric vehicle and the hybrid vehicle may be disabled completely unnecessarily.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a technique for compensating for an abnormal output of a resolver for an environmentally friendly vehicle, which increases the reliability of the hybrid function of a hybrid vehicle and the operation of an electric vehicle by accurately compensating for the current position of a motor rotor in the event of absence of motor rotor position information due to an AD conversion error in a resolver-to-digital converter (RDC) or due to noise, considering that it is necessary to accurately determine the position of the motor rotor in order to control the motor of hybrid and electric vehicles.

In one aspect, the present invention provides a method for compensating for an abnormal output of a resolver for an environmentally friendly vehicle. In particular, a current motor position angle is set before compensation $\theta_{n,ORG}$ as a current motor position angle $\theta_n$. A motor (e.g., rotor) position change $\Delta\theta[rad]$ between a current sampling [n] and a previous sampling [n−1] and a motor (rotor) position change $\Delta\theta_{n-1}$ [rad] between the previous sampling [n−1] and a more previous sampling [n−2] is then obtained by a CPU. A variable A expressed as a difference between the motor (e.g., rotor) position change $\Delta\theta_n$[rad] between the current sampling [n] and the previous sampling [n−1] and the motor (rotor) position change $\Delta\theta_{n-1}$[rad] between the previous sampling [n−1] and the more previous sampling [n−2] is then calculated. The CPU then determines whether to perform the compensation by comparing the calculated variable A and a calibration variable K and calculates a current motor position angle for compensation $\theta_n$[rad]. Finally, the CPU compensates for the absence of motor rotor position information with the calculated current motor position angle for compensation $\theta_n$[rad].

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying to drawings which are given hereinbelow by way of illustration only, and thus are not limitative of the present invention, and wherein.

Figure 1:
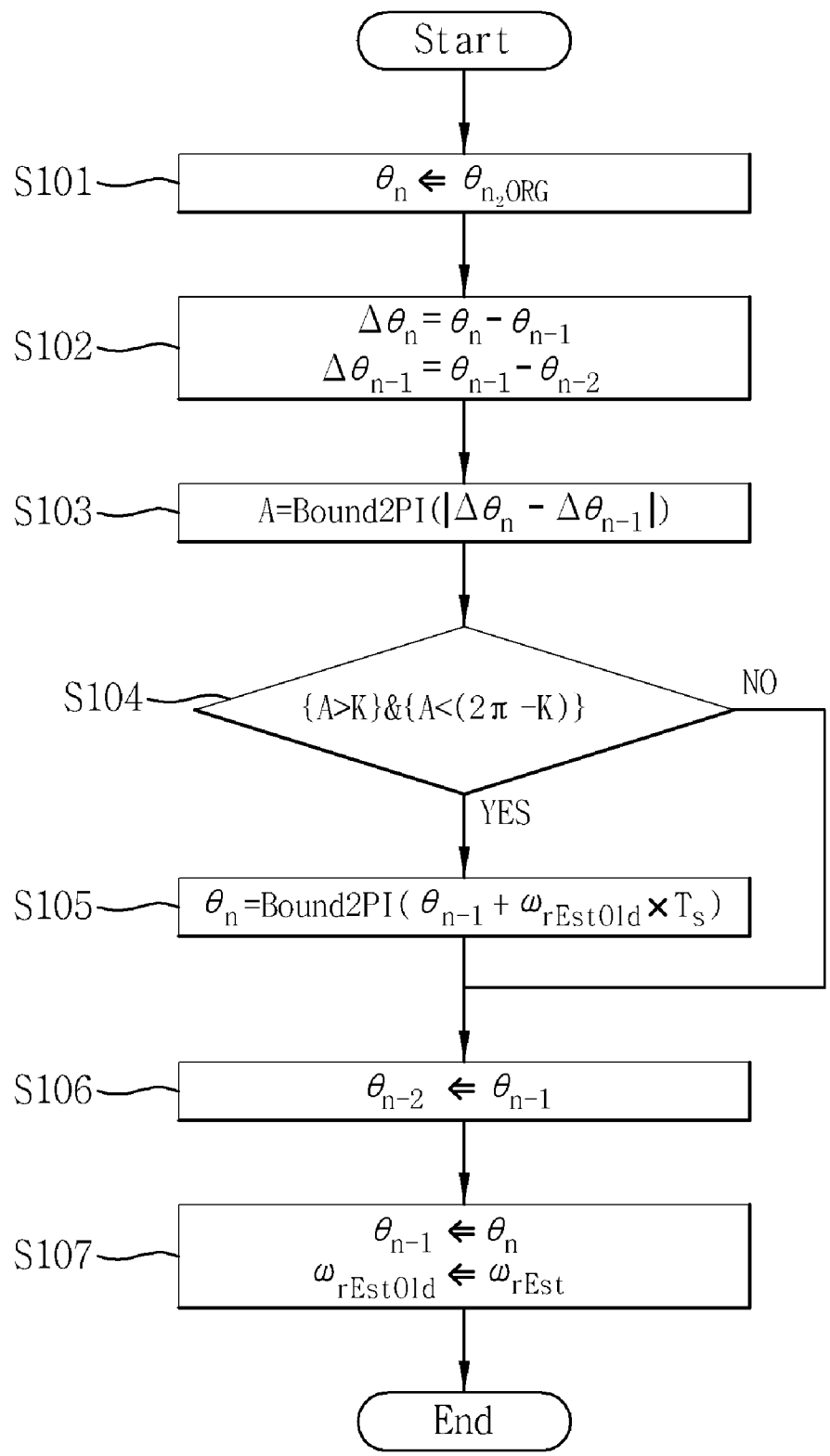
FIG. 1 is a flowchart illustrating a method for compensating for an abnormal output of a resolver for an environmentally friendly vehicle in accordance with an exemplary embodiment of the present invention.

Reference numerals set forth in the Drawings includes reference to the following elements as further discussed below:

100: inverter
101: power module
102: DC link capacitor
103: DC link voltage sensor
104: DC link voltage sensing circuit
105: current sensor
106: current sensing circuit
107: CPU
108: control/gate board
110: battery
120: interior permanent magnet synchronous motor
122: resolver
124: resolver-to-digital converter It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

First, the configuration and function of a resolver will be briefly described for a better understanding of the present invention. For vector control of a synchronous motor or an induction motor used in a hybrid electric vehicle (HEV) or a pure electric vehicle (EV), it is necessary to set a coordinate system in synchronization with the flux position of the motor. To this end, it is necessary to read the absolute position of a rotor of the motor, and thus the resolver is used to detect the absolute position (i.e., rotation angle) of the rotor.

As such, each phase of the rotor is accurately measured by the resolver, and a resolver-to-digital converter (RDC), which includes a synchronous rectifier for rectifying the measurement value and a voltage control oscillator (VCO) for outputting the rectified voltage at a desired oscillation frequency, transmits the measured phase of the rotor. Therefore, to the illustrative embodiment of the present invention accurately controls the motor speed and the motor torque required for the operation of the HEV or EV without unnecessary failures.

Differential signals (S1-S3, S2-S4) output from the resolver may have a frequency of about 10 kHz and an AC voltage of about 1 to 4 V in a normal state. However, if outside this range, i.e., in the event of a failure in input signals (i.e., excitation signals, EXT+, EXT−) or output signals (i.e., basic signals for measuring the speed, S1-S3, S2-S4) of the resolver, a FAULT signal is generated by the RDC and this FAULT signal is transmitted to a CPU, thereby indicating to the CPU that a failure in the detection of the rotor position of the resolver has occurred.

The present invention aims at ensuring the reliability of the hybrid function of a hybrid vehicle and the operation of an electric vehicle by estimating the current rotor position information from the motor speed and rotor position information at the previous sampling in the event of absence of motor rotor position information due to an AD conversion error in the RDC or due to noise.

More specifically, a method for compensating for an abnormal output of a resolver for an environmentally friendly vehicle in accordance with an exemplary embodiment of the to present invention will be described with reference to FIG. 1. In order to obtain a current motor position angle for compensation $\theta_n$[rad], a current motor position angle before compensation $\theta_{n,ORG}$ is set as a current motor position angle $\theta_n$ (S101). For reference, it should be noted that the reason the current motor position angle for compensation is expressed as $\theta_n$ and the current motor position angle is also expressed as $\theta_n$ is that they cannot be expressed in a different manner based on the programming flow of the software.

Next, a motor (rotor) position change $\Delta\theta_n$[rad] between a current sampling [n] and a previous sampling [n−1] according to the output of the RDC is obtained based on the current motor position angle $\theta_n$. Simultaneously, a motor (rotor) position change $\Delta\theta_{n-1}$ [rad] between the previous sampling [n−1] and the more previous sampling [n−2] is also obtained (S102).

That is, the motor (rotor) position change $\Delta\theta_n$[rad] between the current sampling [n] and the previous sampling [n−1] is obtained by subtracting the previous motor position angle $\theta_{n-1}$ from the current motor position angle $\theta_n$. The motor (rotor) position change $\Delta\theta_{n-1}$ [rad] between the previous sampling [n−1] and the more previous sampling [n−2] is obtained by subtracting the more previous motor position angle $\theta_{n-2}$ from the previous motor position angle $\theta_{n-1}$. These values may be obtained by periodically sampling the measurement signals of the motor position angle of the resolver output from the RDC.

Then, a variable A, i.e., a difference between the position change $\Delta\theta_n$[rad] between the current sampling [n] and the previous sampling [n−1] and the position change $\Delta\theta_{n-1}$[rad] to between the previous sampling [n−1] and the more previous sampling [n−2] is calculated by the following formula 1 (S103):

$$A=\text{Bound2PI}(|\Delta\theta_n-\Delta\theta_{n-1}|) \quad \text{[Formula 1]}$$

In formula 1, the function "| |" is a function that outputs an absolute value of an input and the function of "Bound2PI" is a function that limits the input to 0 to $2\pi$(rad). Here, when the sample period is taken at a given point in time, the difference between the motor (rotor) position changes $\Delta\theta_n$[rad] and $\Delta\theta_{n-1}$[rad], which indicate the position changes according to time, may be seen as a difference between the current sampling rate and the previous sampling rate, and this variable A may be expressed as an instantaneous acceleration change.

Next, the variable A calculated in the above manner is compared with a calibration variable K to determine whether to perform the compensation (S104). The calibration variable K is a constant that represents a physical limit. Accordingly, when the instantaneous acceleration change, i.e., the variable A is greater than the calibration variable K and smaller than $2\pi$−K, the compensation for the motor rotor position is determined.

In other words, if the variable A is greater than the calibration K and, at the same time, the variable A is smaller than $2\pi$−K, it is determined that the motor rotor position information is omitted, and thus the compensation for the motor rotor position is determined. Accordingly, the current motor position angle for compensation $\theta_n$[rad] is calculated by the to following formula 2 (S105):

$$\theta_n=\text{Bound2PI}(\Delta\theta_{n-1}+\omega_{rEstOld}\times T_s) \quad \text{[Formula 2]}$$

In formula 2, $\omega_{rEstOld}$ is an estimated speed at the previous sampling (e.g., a position change at the previous sampling rate), $T_s$ represents the control period (us), and the function "Bound2PI" is a function that limits the current motor position angle for compensation to 0 to $2\pi$(rad). As a result, the calibration value, i.e., the current motor position angle for compensation $\theta_n$[rad] is a sum of the previous sampling position $\theta_{n-1}$ and a position change $\omega_{rEstOld}$ at the previous sampling rate. Therefore, the absence of the motor rotor position information is compensated with the current motor position angle for compensation $\theta_n$[rad]calculated by formula 2, thereby continuously ensuring the current of the motor and the torque control performance.

Figure 2A:
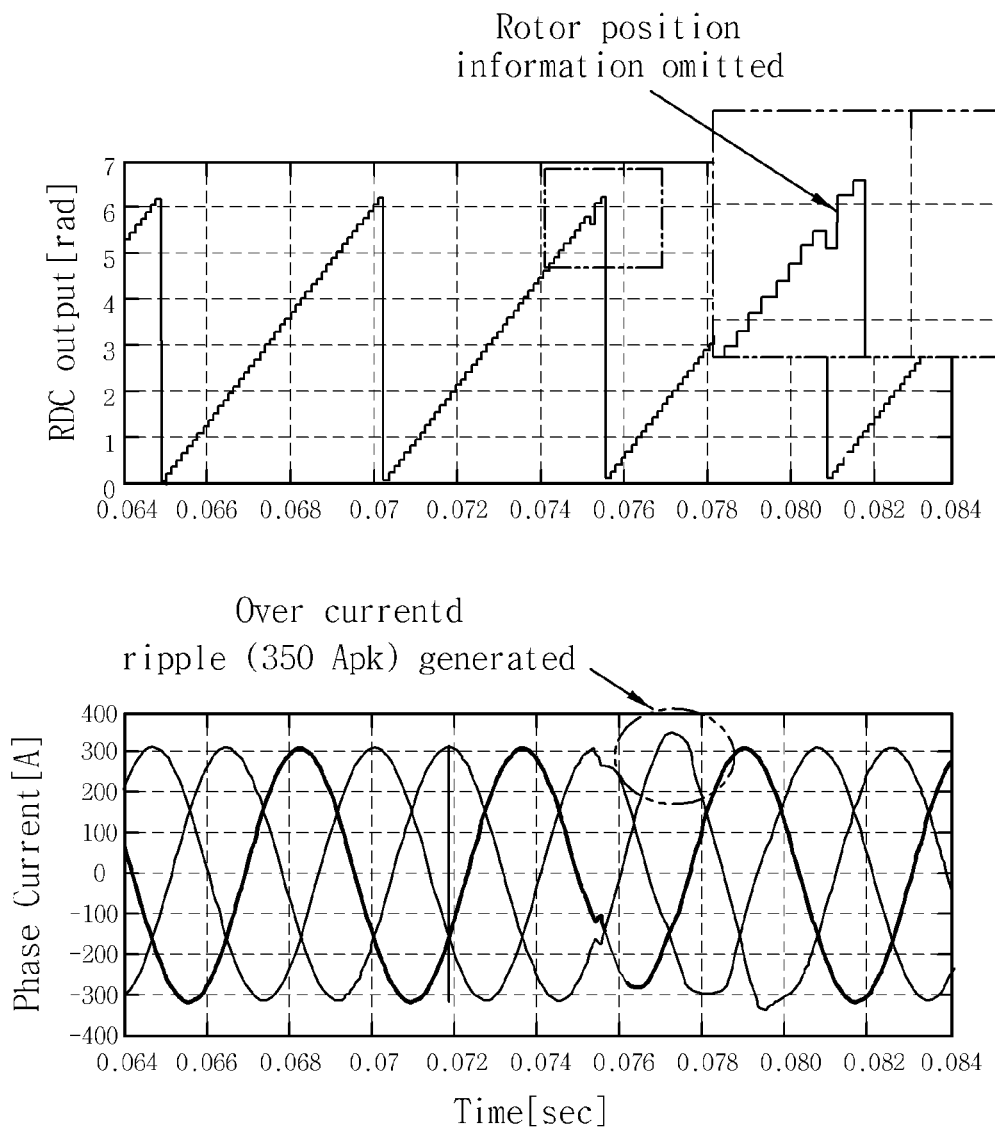
FIGS. 2A and 2B are waveform diagrams illustrating the simulation results before and after applying the method for compensating for an abnormal output of a resolver for an environmentally friendly vehicle in accordance with an exemplary embodiment of the present invention.
Figure 2B:
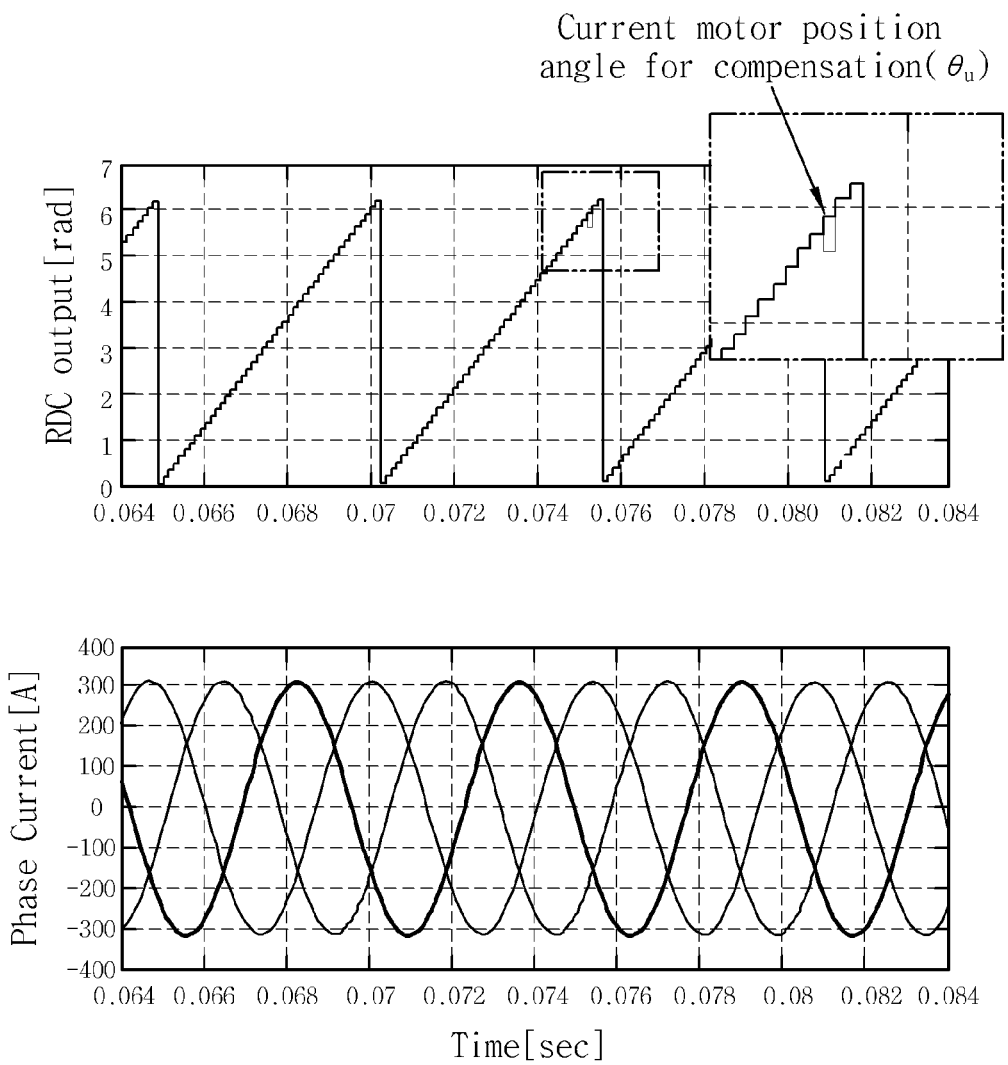
Figure 3:
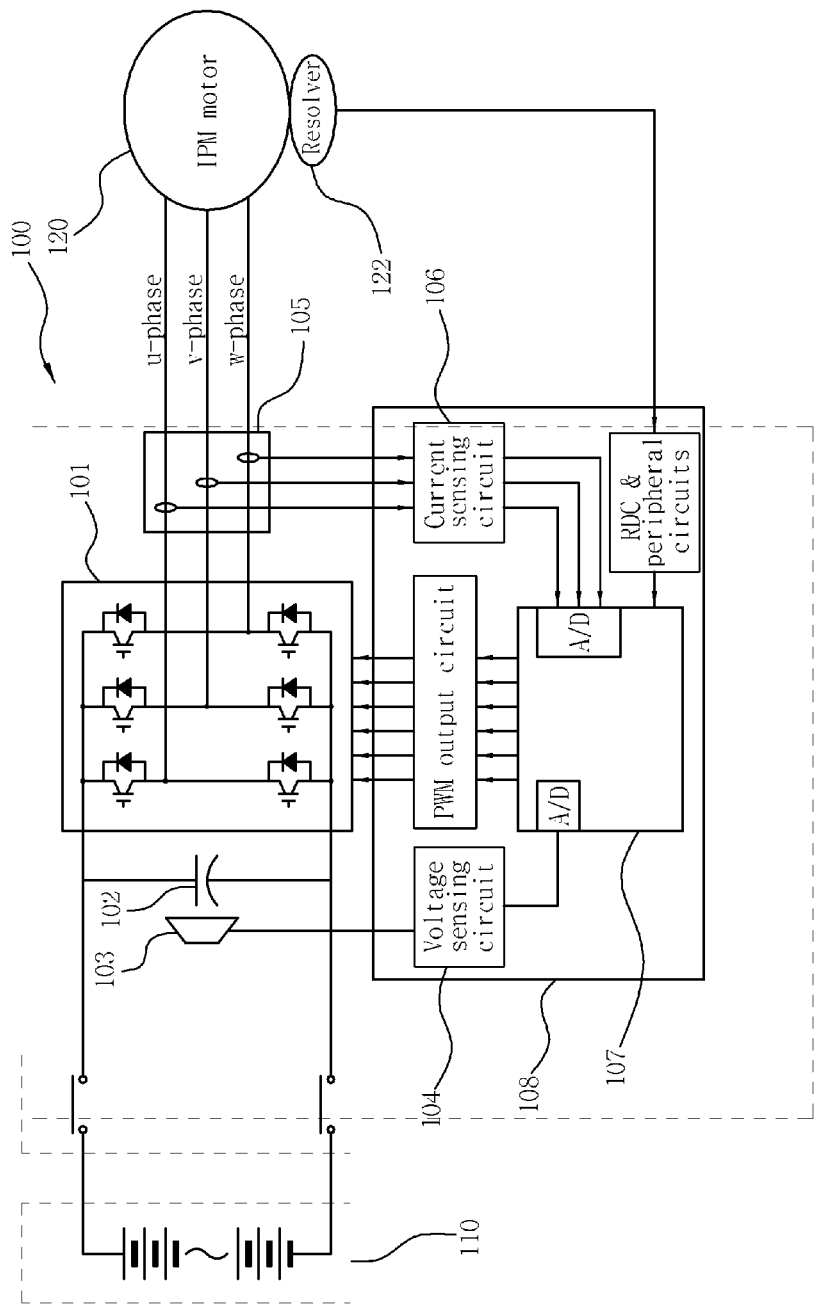
FIG. 3 is a schematic diagram illustrating the configuration of a conventional inverter system for an environmentally friendly vehicle.
Figure 4:
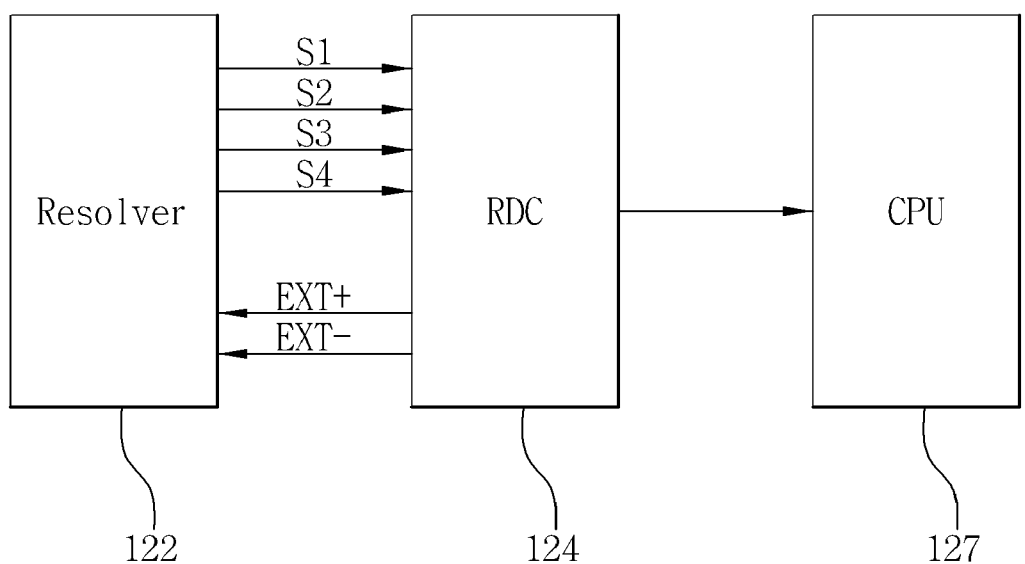
FIG. 4 is a schematic diagram illustrating the signal transmission of a resolver for detecting the speed of a motor and the angle of a rotor.

In more detail, as shown in FIG. 2A, when the motor rotor position information is omitted during a certain sampling during RDC output and, at the same time, a current ripple (e.g., 350 Apk) larger than an abnormal output command current (e.g., 312 Apk) of the resolver is generated at the corresponding period, the omitted motor rotor position information is compensated with the current motor position angle for compensation $\theta_n$[rad] calculated by formula 2 as shown in FIG. 2B, thereby continuously ensuring the current of the motor and the torque control performance.

Meanwhile, after the compensation for the omitted motor rotor position information with the current motor position angle for compensation $\theta_n$[rad] during the RDC output, new motor rotor position information is output at the next sampling period, and thus a process (S106) of assigning and storing the previous motor position angle $\theta_{n-1}$ as the more previous motor position angle $\theta_{n-2}$, a process (S107) of assigning and storing the current motor position angle for compensation $\theta_n$ as the previous motor position angle $\theta_{n-1}$ and, at the same time, assigning and storing an estimated speed to $\omega_{rEst}$[rad/sec] at the current sampling [n] as an estimated speed $\omega_{rEstOld}$[rad/sec] at the previous sampling are performed based on the programming constructed in, e.g., a computer readable medium.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Advantageously, in the event of absence of the rotor position information due to an AD conversion error in the RDC or due to noise, the illustrative embodiment of the present invention accurately determines the current motor rotor position through the compensation method of the present invention, thereby ensuring the current of the motor and the torque control performance.

Moreover, according to the compensation method of the present invention, the reliability and stability of the motor/inverter system, the hybrid function of the hybrid vehicle, and the operation of the electric vehicle is increased, thereby reducing the costs for ensuring the reliability of the resolver signal.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for compensating for an abnormal output of a resolver for an environmentally friendly vehicle, the method comprising:

controlling, by a central processing unit (CPU), a motor rotor speed and torque using at least an output of the resolver; setting, by the CPU, a current motor position angle before compensation θn,ORG as a current motor position angle θn;

obtaining, by the CPU, a motor position change Δθn[rad] between a current sampling [n] and a previous sampling [n−1] and a motor (rotor) position change Δθn−1[rad] between the previous sampling [n−1] and a more previous sampling [n−2];

calculating, by the CPU, a variable A expressed as a difference between the motor position change Δθn[rad] between the current sampling [n] and the previous sampling [n−1] and the motor (rotor) position change Δθn−1[rad] between the previous sampling [n−1] and the more previous sampling [n−2];

determining, by the CPU, whether to perform the compensation in an absence of motor rotor position information by comparing the calculated variable A and a calibration variable K which is a constant of a limit value of an instantaneous acceleration change, wherein in the absence of motor rotor position information, when the variable A is greater than the calibration variable K and smaller than 2π−K, the compensation for the motor rotor position due to the absence of motor rotor position information is determined;

calculating, by the CPU, a current motor position angle for compensation θn[rad] when the compensation for the motor rotor position is determined; and compensating the motor rotor speed and torque, by the CPU, for the absence of motor rotor position information with the calculated current motor position angle for compensation θn[rad].

2. The method of claim 1, wherein the motor (rotor) position change Δθn[rad] between the current sampling [n] and the previous sampling [n−1] is obtained by subtracting the previous motor position angle θn−1 from the current motor position angle θn, and the motor (rotor) position change Δθn−1[rad] between the previous sampling [n−1] and the more previous sampling [n−2] is obtained by subtracting the more previous motor position angle θn−2 from the previous motor position angle θn−1.

3. The method of claim 1, wherein the variable A is a speed difference between the current sampling [n] and the previous sampling [n−1].

4. The method of claim 1, wherein in the determining of whether to perform the compensation, when the variable A is greater than the calibration variable K and smaller than 2π−K, the compensation for the motor rotor position is determined.

5. The method of claim 1, wherein current motor position angle for compensation θn[rad] is determined as a sum of the previous sampling position θn−1 and a position change ωrEstOld at the previous sampling rate.

6. The method of claim 1, further comprising:
assigning and storing the previous motor position angle θn−1 as the more previous motor position angle θn−2; and
assigning and storing the current motor position angle for compensation θn[rad] as the previous motor position angle θn−1 and, at the same time, assigning and storing an estimated speed ωrEst[rad/sec] at the current sampling [n] as an estimated speed ωrEstOld[rad/sec] at the previous sampling.

7. A non-transitory computer readable medium containing program instructions executed by a processor or controller, the computer readable medium comprising:
program instructions that control a motor rotor speed and torque using at least an output of a resolver;
program instructions that set a current motor position angle before compensation θn,ORG as a current motor position angle θn;
program instructions that obtain a motor position change Δθn[rad] between a current sampling [n] and a previous sampling [n−1] and a motor (rotor) position change Δθn−1[rad] between the previous sampling [n−1] and a more previous sampling [n−2];
program instructions that calculate a variable A expressed as a difference between the motor position change Δθn[rad] between the current sampling [n] and the previous sampling [n−1] and the motor (rotor) position change Δθn−1[rad] between the previous sampling [n−1] and the more previous sampling [n−2];

program instructions that determine whether to perform the compensation in an absence of motor rotor position information by comparing the calculated variable A and a calibration variable K which is a constant of a limit value of an instantaneous acceleration change, wherein in the absence of motor rotor position information, when the variable A is greater than the calibration variable K and smaller than 2π−K, the compensation for the motor rotor position due to the absence of motor rotor position information is determined;

program instructions that calculate a current motor position angle for compensation θn[rad] when the compensation for the motor rotor position is determined; and program instructions that compensate the motor rotor speed and torque for the absence of motor rotor position information with the calculated current motor position angle for compensation θn[rad].

8. The non-transitory computer readable medium of claim 7, wherein the motor (rotor) position change Δθn[rad] between the current sampling [n] and the previous sampling [n−1] is obtained by subtracting the previous motor position angle θn−1 from the current motor position angle θn, and the motor (rotor) position change Δθn−1[rad] between the previous sampling [n−1] and the more previous sampling [n−2] is obtained by subtracting the more previous motor position angle θn−2 from the previous motor position angle θn−1.

9. The non-transitory computer readable medium of claim 7, wherein the variable A is a speed difference between the current sampling [n] and the previous sampling [n−1].

10. The non-transitory computer readable medium of claim 7, wherein when the variable A is greater than the calibration variable K and smaller than 2π−K, the compensation for the motor rotor position is determined by the program instructions that determine whether to perform the compensation.

11. The non-transitory computer readable medium of claim 7, wherein current motor position angle for compensation θn[rad] is determined as a sum of the previous sampling position θn−1 and a position change ωrEstOld at the previous sampling rate.

12. The non-transitory computer readable medium of claim 7, further comprising:
program instructions that assign and store the previous motor position angle θn−1 as the more previous motor position angle θn−2; and
program instructions that assign and store the current motor position angle for compensation θn[rad] as the previous motor position angle θn−1 and, at the same time, assign and store an estimated speed ωrEst[rad/sec] at the current sampling [n] as an estimated speed ωrEstOld[rad/sec] at the previous sampling.

* * * * *